No. 874,209. PATENTED DEC. 17, 1907.
I. KITSEE.
ELECTRIC TRANSMISSION OF INTELLIGENCE.
APPLICATION FILED AUG. 26, 1907.
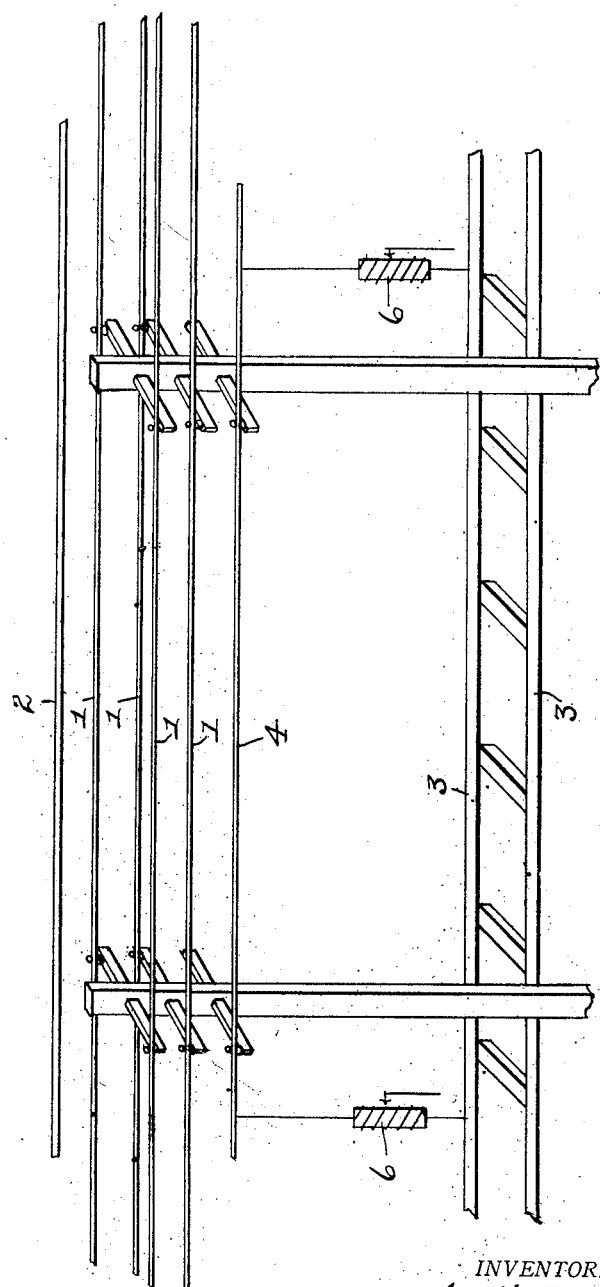
WITNESSES:
INVENTOR.

UNITED STATES PATENT OFFICE.

ISIDOR KITSEE, OF PHILADELPHIA, PENNSYLVANIA.

ELECTRIC TRANSMISSION OF INTELLIGENCE.

No. 874,209.

Specification of Letters Patent.

Patented Dec. 17, 1907.

Application filed August 26, 1907. Serial No. 390,179.

*To all whom it may concern:*

Be it known that I, ISIDOR KITSEE, citizen of the United States, residing at Philadelphia, in the county of Philadelphia and State of Pennsylvania, have invented certain new and useful Improvements in Electric Transmission of Intelligence, of which the following is a specification.

My invention relates to an improvement in electric transmission of intelligence. Its object is to provide means, so as to neutralize the inducing effects of such circuits from neighboring wires carrying power current.

In electric railroading of to-day, in some cases, the phase current is used and lines of transmission placed in the region of the inducing effect of such power wires are affected to a degree, so as to make the transmission of intelligence well nigh impossible.

To counteract the inducing effect of the so-called "trolley" or "aerial" wire is the aim of my invention.

The drawing represents in diagram a series of circuits useful for the transmission of intelligence, a power wire, the rails as a return and embodying my invention.

1, 1, 1, 1 are the lines of transmission; 2 is the power wire; 3 are the rails used as the return and 4 is a wire shunting the rails. This wire is, as illustrated, provided with means 6, so as to vary the current flowing therein.

The operation of this device is as follows:—The current of the power wire 2 induces impulses in the lines of transmission 1, 1, 1, 1. The current in the shunt 2 of the return rails 3 will induce impulses in the opposite direction and, therefore, both these inducing effects will be neutralized on the lines of transmission 1, 1, 1, 1.

It is obvious that as the line or conductor 4 is nearer to the lines of transmission than the power wire 2, the current flowing into 4 should be less than the current flowing through the power wire proper, and the means 6 are for the purpose, so as to proportion the volume of the current necessary to flow through said neutralizing wire.

Having now described my invention, what I claim as new and desire to secure by Letters Patent is:—

1. Means to neutralize the inducing effect of a power wire on neighboring lines of transmission, said means comprising a conductor placed in the neighborhood of the lines of transmission and connected in shunt with the return of said power wire.

2. In combination with a series of lines useful for transmitting intelligence, a power wire positioned in the inducing region of said lines, a return for said power wire, a shunt circuit for said return, said shunt circuit positioned in the neighborhood of said lines of transmission.

3. Means to neutralize the inducing effect of a power wire on neighboring lines of transmission, said means embracing a conductor positioned near said lines of transmission, said conductor forming a shunt around the return for said power wire and means in said shunt to vary the flow of the current in said conductor.

4. In a system of power transmission wherein the rails of travel are the return, means to neutralize the inducing effect of said power wire on neighboring lines of transmission, said means comprising a conductor positioned near said lines of transmission, said conductor shunting part of said rails of travel.

In testimony whereof I affix my signature in presence of two witnesses.

ISIDOR KITSEE.

Witnesses:
 EDITH R. STILLEY,
 MARY C. SMITH.